June 30, 1970　　　　　J. H. HEDGER　　　　　3,517,762
LOAD EXCHANGER FOR WEIGHER
Filed Feb. 7, 1969　　　　　　　　　　　　　　　3 Sheets-Sheet 1

INVENTOR.
JOHN H. HEDGER
BY Harry A. Herbert
and Jacob N. Erlich
ATTORNEYS

INVENTOR.
JOHN H. HEDGER

June 30, 1970  J. H. HEDGER  3,517,762
LOAD EXCHANGER FOR WEIGHER

Filed Feb. 7, 1969  3 Sheets-Sheet 3

INVENTOR.
JOHN H. HEDGER
BY Harry A. Herbert, Jr.
and Jacob N. Erlich
ATTORNEYS

United States Patent Office 3,517,762
Patented June 30, 1970

3,517,762
LOAD EXCHANGER FOR WEIGHER
John Henry Hedger, Lakeside, Calif., assignor to the United States of America as represented by the Secretary of the Air Force
Filed Feb. 7, 1969, Ser. No. 797,480
Int. Cl. G01g 19/14, 23/02
U.S. Cl. 177—153                                    4 Claims

ABSTRACT OF THE DISCLOSURE

A load exchanger for transferring the weight of an article on and off a weighing device. The load exchanger having a housing and a load string assembly containing a weighing device, whereby raising the load string assembly places the weight of an article on the weighing device and lowering of the load string assembly transfers the weight of the article off the weighing device.

Background of the invention

This invention relates generally to load exchangers, and more particularly to load exchangers capable of facilitating the alternate loading and unloading of a weighing device during a typical weight and balance operation.

Frequently when picking up articles from the floor, especially large articles, hoisting equipment, such as cranes, chain falls, etc. may exhibit sudden shock loading to the hoisting system which can exceed by a large factor the actual weight of the article being hoisted. Although this shock loading may endure only for a short period of time, still if a weighing device were used in this system, the total capacity of which is near the weight of the article being lifted, then sufficient overload conditions may occur to destroy the weighing device. Therefore, special and expensive devices are presently used, for example: hydro-set, etc. to insure somewhat smooth acceleration during pickup.

Furthermore, during a weight and balance operation, as presently performed in industry, it is conventional to "exercise" the weighing device being used, by alternate loading and unloading until the weighing device has reached its own stable operating point at which time consecutive readings become highly repeatable. At this time, the weighing operation can begin, but even then the article on which weight and balance is being performed must be lifted and set down a sufficient number of times to obtain at least three weighings which are substantially equal.

When the article on which weight and balance is being performed consists of cellular construction, such as conventional on space vericles, safe handling becomes a problem in that unfinished vehicles might easily become damaged while being lifted from the floor area or lowering to the floor area, or suitable resting point, if not handled with extreme care. In order to properly protect such facilities, it is common practice to utilize special items of handling equipment which may require the manipulation of a multiplicity of fasteners, such as bolts and screws, which is time consuming and therefore greatly increase the production cost of the article. It is common in industry to expend as many as eight to twelve hours in the above operations merely in the preparation to perform weight and balance. The performance itself may be quite time-consuming when it is necessary to alternately raise and lower the vehicle, especially when there are many fasteners to manipulate each time the operation is performed.

In industry of today, some fabricated articles being of a fragile nature, during the fabrication operation, it is necessary that extreme care be taken to insure that these partially completed and completed articles suffer no damage from dropping during normal fabrication procedures. It is common practice to insure protection of the article by "proofloading" the handling equipment to somewhere between 2.5 to 7 times the expected loads which the handling equipment will be expected to accommodate, thereby insuring against breakage of the handling equipment. In the case of weight and balance operation on an article, optimum performance in the weighing operation is obtained through the use of a weighing device such as a load cell, or mass sensing transducer, the total capacity of which is near the load to be sensed. When this set of conditions occurs, it would therefore not be possible to "proofload" the weighing device to, for instance, five times the load which it is expected to handle, since in so doing the transducer or other weighing device would be destroyed. Conversely, if the weighing device used has a total capacity that will permit adequate proofloading to insure safe handling of the object weighed, the weight and balance operation becomes degraded in accuracy.

Summary of the invention

The instant invention overcomes the problems heretofore encountered and as set forth above. The load exchanger of the instant invention transfers the entire weight of the article lifted to the weighing device at the precise time the weighing and balancing operation takes place. The load exchanger of the instant invention is suspended from a conventional hoisting apparatus by means of an upper lifting eye, and the load to be suspended is attached to a lower lifting ring. The upper lifting eye is fixedly secured or integral with the upper part of a case or housing, while the lower lifting ring forms part of a load string assembly contained within said housing. The load string assembly is made up of a piston located within a cylinder which is fixedly secured to said housing. The piston has attached to its lower end an upper flexture member which in turn is secured to one end of a suitable weighing device, such as a load cell or mass sensing transducer. The lower lifting ring is secured or is integral with a bottoming ring which is attached to or is formed in the lower end of a lower flexture member. The lower flexture member is attached to the other end of said weighing device.

In the de-energized position the entire weight of the load is being supported by the housing. The load exchanger is, at a desired time, energized by admitting a fluid into the cylinder forcing the piston to the up position. As the piston moves toward the up position the load attached to the lower lifting ring is simultaneously lifted toward the up position and the bottoming ring moves out of contact with the housing. In this up or energized position the entire weight of the load is now being supported by the weighing device. In this manner the weighing device can perform its weighing and balancing operation without having been subjected to any initial shock load put upon the system.

It is therefore an object of this invention to provide a load exchanger which facilitates the alternate loading and unloading of a weighing device during a weighing and balancing operation.

It is another object of this invention to provide a load exchanger which permits adequate "proofloading" of a weighing device.

It is a further object of this invention to provide a load exchanger which utilizes conventional, currently available components that lend themselves to standard mass producing manufacturing techniques.

For a better understanding of the present invention together with other and further objects thereof, reference is made to the following description taken in connection with the accompanying drawing and its scope will be pointed out in the appended claims.

Description of the preferred embodiment

Figure 1:
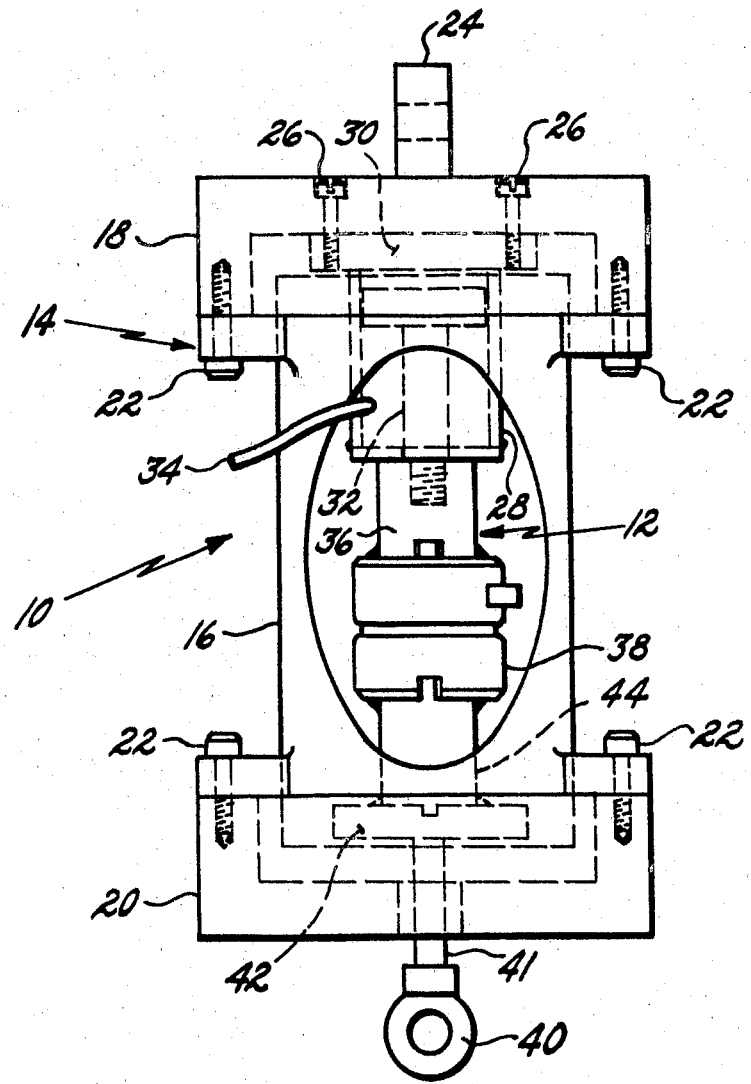
FIG. 1 represents a front elevational view of the load exchanger of this invention in the energized position.

Referring now to FIG. 1, the numeral 10 represents the load exchanger of this invention. The load exchanger 10 is made up of a load string assembly 12 located within casing or housing 14. The housing 14 has a hollow central portion 16 having a top cap 18 and a bottom cap 20 fixedly secured thereto by any suitable securing means such as bolts 22. The load exchanger 10 is suspended by any conventional hoisting apparatus (not shown) at its upper end by means of an upper lifting eye 24 fixedly secured to or forming an integral part of top cap 18.

Figure 2:
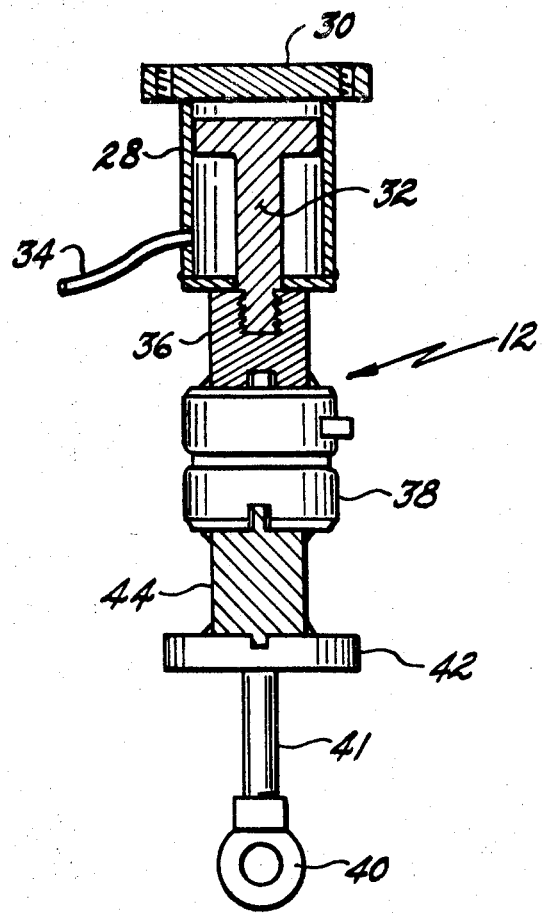
FIG. 2 represents a front elevational view of the load string assembly of this invention, partly in cross section.

Within casing 12 and fixedly secured at one end by any suitable securing means such as bolts 26 to top cap 18 is load string assembly 12. The load string assembly 12 is shown in detail in FIG. 2. A cylinder 28 has a suspension collar 30 integral therewith and containing therein piston 32. A fluid line 34 is secured to said cylinder 28 for the purpose of admitting and releasing a fluid. The piston 32 is fixedly secured at its lower end by any conventional securing means to upper flexture member 36 which is in turn fixedly secured to one end of any suitable weighing device 38 such as a load cell or mass sensing transducer. A lower lifting ring 40 is removably fastened to stem 41 which forms an integral part of bottoming ring 42. Bottoming ring 42 in turn is secured by any suitable fastening means to one end of lower flexture member 44. The other end of weighing device 38 is secured to the other end of lower flexture member 44.

As seen in FIG. 1, the load string assembly 12 is located within central portion 16 of casing 14 and is fixedly secured to top cap 18. The load to be weighed (not shown) is attached in any suitable manner to the lower lifting ring 40. The load exchanger is energized and operation effected by admitting gas or fluid under pressure through line 34 to the cylinder 28. The fluid pressure raises piston 32 to its full amount of travel, thereby lifting the load to be weighed. The system is de-energized by releasing the pneumatic pressure through line 34.

Mode of operation

Figure 3:
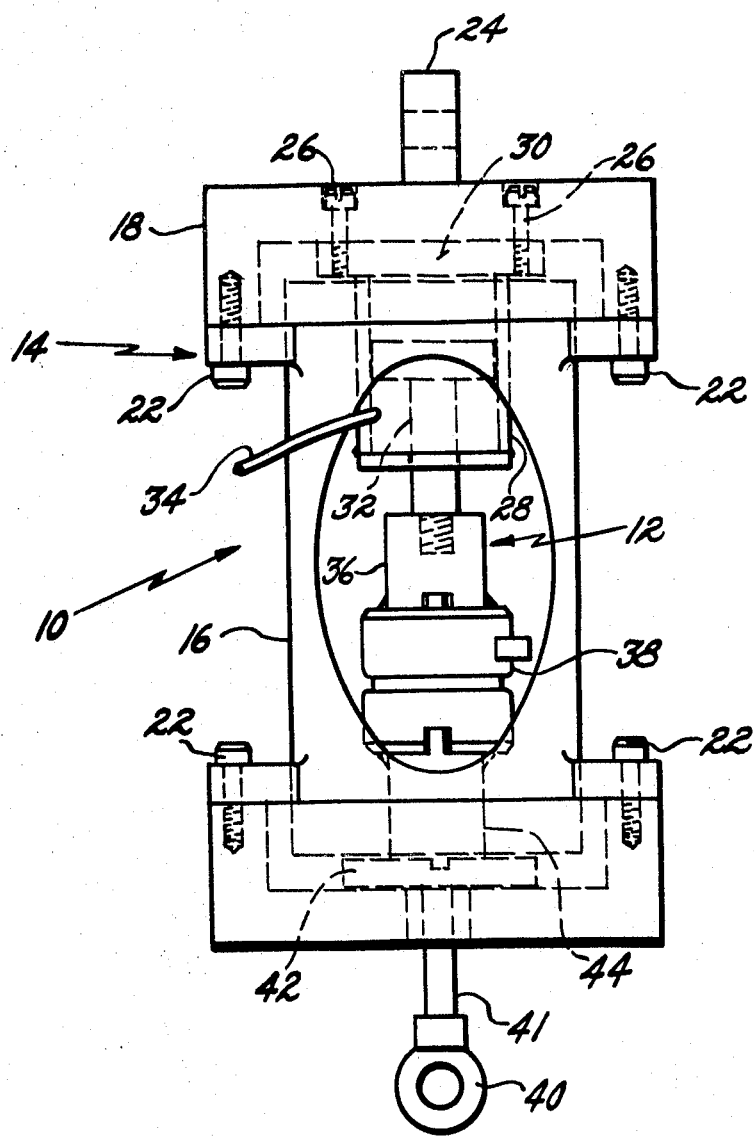
FIG. 3 represents a front elevational view of the load exchanger of this invention in the de-energized position.

When it becomes necessary to weigh an object, the upper lifting eye 24 is attached to any suitable lifting means. The system is de-energized by releasing the pneumatic pressure from cylinder 28. A load or article to be weighed is secured to the lower lifting ring 40. Upon lifting of the load exchanger 10 the casing or housing 14 raises until the inner surface of bottom cap 20 supports the bottoming ring 42 (see FIG. 3). Thereupon any further lifting of the load exchanger 10 lifts the article with its entire weight being supported by the casing 14 as shown clearly in FIG. 3. When the article to be weighed is sufficiently above the ground, fluid or gas is admitted through line 34 raising the piston 32 to the position shown in FIG. 1. Now the entire weight of the article to be weighed is transferred to the load string assembly 12 and therefore the weighing device 38. After sufficient readings have been taken the load exchanger 10 is again de-energized by releasing the pneumatic pressure from cylinder 28 and the weight of the article is again transferred from the weighing device 38 to the casing or housing 14.

Although the invention has been described with reference to a particular embodiment, it will be understood to those skilled in the art that the invention is capable of a variety of alternative embodiments within the spirit and scope of the appended claims.

I claim:

1. A load exchanger comprising a housing, a load string assembly fixedly secured at one end to said housing, said load string assembly including means for raising and lowering said load string assembly, a weighing means attached at one end to said raising and lowering means, a lifting ring secured to the other end of said weighing means and an actuating means operably associated with said raising and lowering means, whereby actuation of said raising and lowering means raises said load string assembly, thereby placing the entire weight of an article attached to said lifting ring onto the weighing device and de-actuation of said raising and lowering means transfers said entire weight off said weighing device.

2. A load exchanger as defined in claim 1 wherein said load string assembly further comprises a bottoming ring secured between the other end of said weighing means and said lifting ring, and said housing having a bottom cap, whereby in the de-activated position said bottom cap supports said bottoming ring.

3. A load exchanger as defined in claim 2 wherein said raising and lowering means comprises a cylinder having a suspension collar secured to said housing, a piston within said cylinder secured at its lower end to one end of said weighing device and said actuating means comprising a fluid line associated wth said cylinder whereby raising of said load string assembly is effected by admitting a fluid under pressure through said line.

4. A load exchanger as defined in claim 3 wherein said weighing means is a load cell.

References Cited

UNITED STATES PATENTS

| 1,435,603 | 11/1922 | Hanser | 177—147 |
| 2,304,402 | 12/1942 | Faulkner | 177—147 XR |
| 2,482,027 | 9/1949 | Poole | 177—152 |
| 2,732,113 | 1/1956 | Rice | 177—152 |
| 2,765,654 | 10/1956 | Greer et al. | 177—147 XR |
| 3,263,497 | 8/1966 | Leiber | 177—151 XR |

ROBERT S. WARD, JR., Primary Examiner

U.S. Cl. X.R.

177—147